UNITED STATES PATENT OFFICE.

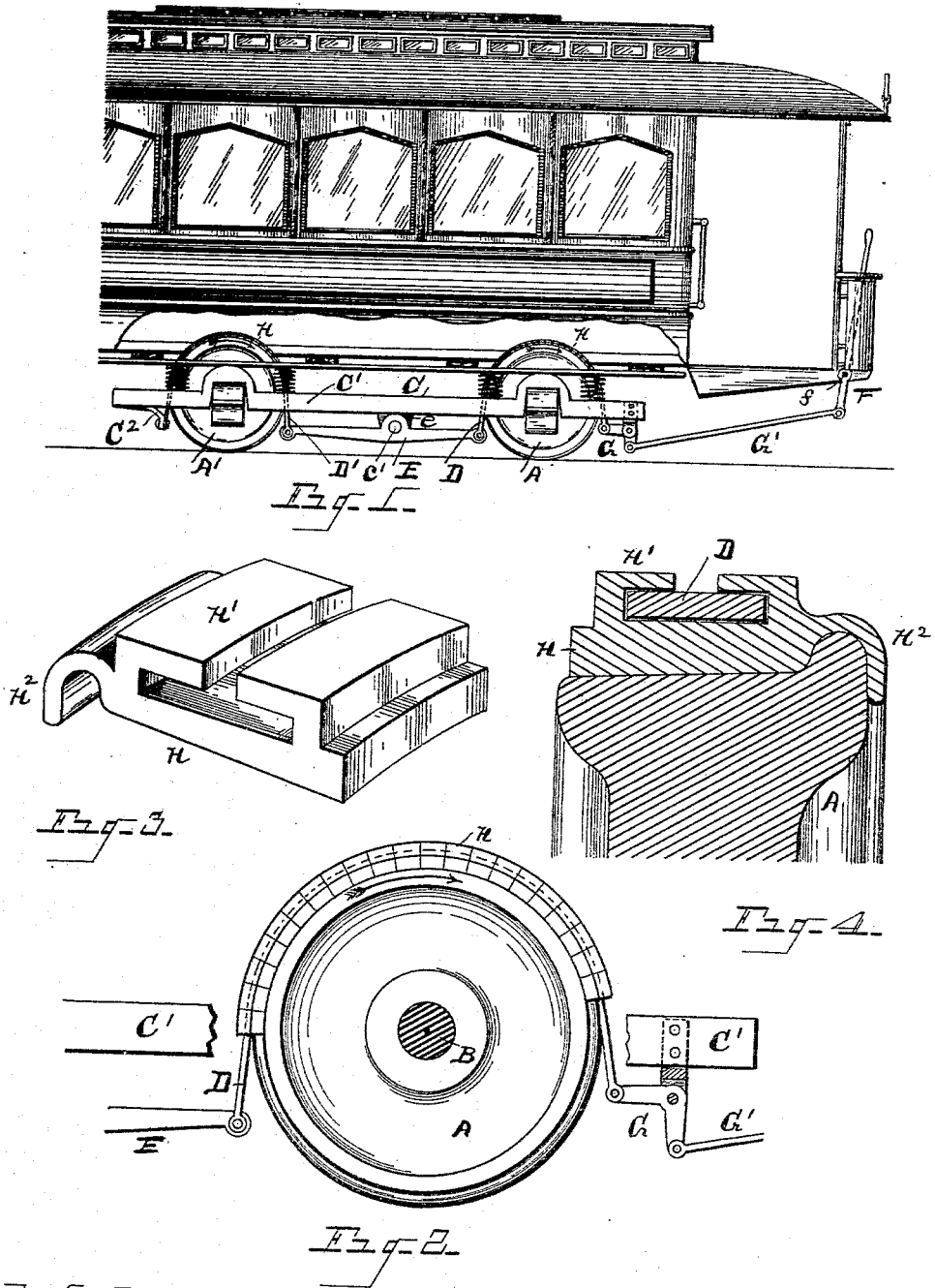

JOHN KERWIN, OF DETROIT, MICHIGAN, ASSIGNOR OF ONE-HALF TO ANDREW McBRIDE AND JOHN CAMPBELL, OF SAME PLACE.

CAR-BRAKE.

SPECIFICATION forming part of Letters Patent No. 514,655, dated February 13, 1894.

Application filed September 19, 1893. Serial No. 485,772. (No model.)

*To all whom it may concern:*

Be it known that I, JOHN KERWIN, a citizen of the United States, residing at Detroit, county of Wayne, State of Michigan, have invented a certain new and useful Improvement in Car-Brakes; and I declare the following to be a full, clear, and exact description of the invention, such as will enable others skilled in the art to which it appertains to make and use the same, reference being had to the accompanying drawings, which form a part of this specification.

My invention relates to a certain new and useful improvement in car brakes, having for its object a brake for cars, and more especially for street cars, of superior efficiency, economy and utility; a brake which may be readily applied and operated.

My improved brake is designed more particularly for attachment to electric cars, although I do not confine myself to any limited application of my invention.

My invention consists of the devices and appliances, their construction, combination and arrangement as hereinafter described and claimed and illustrated in the accompanying drawings, in which—

Figure 1 is a side elevation. Fig. 2 is an enlarged view in side elevation, showing the axle in section and one of the band brakes with the shoes engaged therewith. Fig. 3 is a separate view of one of the brake shoes in perspective. Fig. 4 is a vertical cross section through one of the brake shoes, its corresponding band brake and wheels.

The importance of a brake mechanism under easy and full control of the motor man or driver; one which will not be liable to get out of order, and which may be easily operated, is well understood.

I carry out my invention as follows. A and A' represent trucks or car wheels.

B represents the axles.

C represents the truck frame.

C' represents, especially one of the side bars running longitudinally of the car. The truck or wheel A, it will be observed, belongs to the forward pair of wheels, and A' belongs to the rear pair of wheels.

D and D' represent band brakes engaged upon the periphery of the car wheels, A, A' respectively.

E is an evener extended longitudinally of the car engaged at its extremities with the brakes D and D', and fulcrumed intermediate its extremities upon the truck frame, as upon a bracket "e" depending from said bar C', the fulcrum being shown at c'.

It will be observed that the band brake D is engaged upon the periphery of the front wheel A, while the band brake D' is engaged over the periphery of the rear wheel A'. The rear extremity of the brake D' is engaged with the truck frame, as for example, to an arm, $C^2$ depending from the truck frame to the rear of the wheel A'. The forward end of the forward brake D is engaged in any suitable manner with an operating lever or similar device, F, suitably fulcrumed as at "f" upon the car frame. I prefer to interpose between the operating lever and the brake D, a bell-crank lever G, connected at one end to the band brake, and at the other end by means of a connecting rod G' to the lower end of the operating lever below the fulcrum "f." It will be observed that by operating the lever F, the brake D will be forced upon the periphery of the car wheel A, the bell-crank lever giving a downward pull of the operating lever upon the brake. Attention is particularly called to the fact that the forcing of the forward brake D downward upon the periphery of the corresponding wheel, exerts a pull upward upon the forward end of the evener E, in consequence of which the rear end of said lever is correspondingly forced in a downward direction, thereby applying the rear brake D' upon the periphery of the corresponding wheel A'. The two brakes are thus simultaneously set by the operation of the lever F. Not only is the force applied by the operator to the lever F, communicated to the rear brake through the medium of the evener E, but attention is again especially called to the fact that in addition to the power applied to the lever F by the operator, a great amount of force is exerted, to apply the rear brake, by the friction and motion of the forward wheel A, as the corresponding brake D is forced into contact therewith. It will be evident that the motion of wheel A in a forward direction, as indicated by the arrow, exerts a strong pull upon the brake D in a corresponding direction in the same manner as a rotating pulley exerts a corresponding pull upon a belt engaged thereupon. This upward and forward pull of the car wheel A upon the brake D, caused by the frictional contact of the one with the other, is a very material point, and a point of great advantage in my improved brake, as thereby the forward wheel A, in frictional contact with its brake D, does a large part of the work in the application of the rear brake D' upon the rear wheel A', thereby exerting a power upon the rear brake, impossible to be exerted through the medium of the operating lever F alone. On this account the brake is very easily operated by the motor man or driver, for the reason that when he applies the brake D, the friction of the wheel A in contact therewith, instantly responds to add its great force, tending to lift the forward end of the evener E, and thereby to pull down the rear brake upon the periphery of the wheel A'.

The arrangement of the apparatus above described, enables me to utilize this frictional power of the front wheel upon the front brake to set the rear brake upon the rear wheel. At the same time, should the wheels begin to slide, a slight yielding of the operating lever F would discontinue this frictional power which might again quickly and readily be brought into use.

Upon each of the brakes D and D', I prefer to locate a series of brake shoes H. These shoes may be constructed with an open head H', through which the corresponding band brake may be passed, said shoes being slipped over the brake band. Each shoe may be constructed with a curved arm H² to ride over the flange of the car wheel. I prefer that these shoes should be of comparatively small measurement, say, two inches long each. It will be apparent that when any one of them wears out to the head H', the curved arm and head will readily drop off from the brake band. The adjacent shoe may then simply be slipped down upon the shoes next in order, and a new shoe may be slipped over the end of the band. In this manner the shoe may readily and quickly be replaced when worn out, at all times. I do not, however, limit myself solely to the employment of these shoes in connection with the band brake, as the band brake may be employed without them when desired.

I have shown in the drawings, a brake attached at one side of the car over one set of wheels. I would have it understood, however, that a similar brake is applied to the opposite side of the car, except when the operating lever F is connected with the adjacent band brake at the opposite end of the car, the two brakes being necessary to efficiently control the car from both ends, as when going in opposite directions.

Another point of great advantage in this construction, is in the fact that should a wheel begin to slide upon the rail, it will, of course, loose its frictional power upon its brake above described, causing the brake to yield to a sufficient degree to permit the wheel to again revolve, the further revolution exerting the same friction again to tighten the brake. In this way it is evident that all liability of damage to the wheels from sliding is effectually overcome. The two brakes are entirely separated, the one from the other, and either can be used, as in case of accident. It will be seen that while the brake might be applied by a lever at the rear end of the car, the frictional power above described to increase the tension of the brake upon the wheel, would not be operated from the rear end, but, nevertheless, power might be applied by means of the operating lever to handle the car, though not so readily nor so easily.

I have shown and described the band brakes as engaged over the upper edge of the car truck or wheels; this it will be seen, gives larger leverage on account of the larger diameter of the wheel, than would be the case, were the band located over a pulley engaged upon the axle. In the case of electric cars, it is generally impossible to locate a pulley upon the axle, still it is evident that the principle of my invention would be the same if applied to a suitable pulley upon the axle, and such a construction therefore, comes within the scope of my invention.

What I claim as my invention is—

1. The combination with a car truck provided with wheels A A', of a brake consisting of bands extending over the top of each of said wheels respectively, an evener fulcrumed intermediate its ends engaged at its extremities with said bands, and a lever connected with the band located over the front wheel, substantially as described.

2. The combination with the car truck provided with wheels A A', of a brake consisting of bands extending over the upper edges of said wheels, an evener extending longitudinally of the car, fulcrumed intermediate its ends and engaged at its extremities with said bands, and an operating lever connected with one of said bands, substantially as described.

3. The combination with a car truck provided with a truck frame having side bars C' and with wheels A A', of a brake consisting of bands extending over the upper edges of said wheels respectively, an evener engaged at its extremities with said bands, extending longitudinally of said side bars, and having a fulcrumed connection therewith intermediate its ends between said wheels, and an operating lever connected with the band over the front wheel, substantially as described.

4. The combination with a car truck provided with wheels A A', of a brake consisting of bands extending over the upper edges of said wheels respectively, an evener fulcrumed intermediate its ends between said wheels and extending longitudinally therewith, engaged at its extremities with said bands, and an operating lever connected with the forward end of the band over the front wheel, whereby the front band will be forced into engagement with the front wheel, and thereby tilt said evener to force the rear band upon the rear wheel, substantially as described.

5. The combination with a car truck provided with wheels A A', of a brake consisting of bands extending over the upper edges of said wheels respectively, an evener located at the side of the car truck and extending longitudinally therewith between said wheels and connecting said bands, an operating lever connected with the front end of the band over the front wheel, and a bell-crank lever connecting the operating lever with the forward end of the forward band, substantially as described.

6. The combination with a car truck provided with wheels A A', of a brake consisting of bands extending over the upper edges of said wheels respectively, an evener located between said wheels connecting said bands and fulcrumed intermediate its extremities, an operating lever connected with one of the said bands, and brake shoes engaged with each of the said bands, substantially as described.

7. In a car brake, the combination with the car wheels A, A', of independent band brakes extending over the top of each of said wheels respectively, means of connecting said brakes whereby they will be simultaneously operated, and an operating lever connected with one of said brakes, substantially as set forth.

8. The combination with a band brake, of a brake shoe H provided with a head H' to receive said band, and an arm H², substantially as described.

9. The combination with a car truck, of a brake consisting of bands A A', an evener fulcrumed intermediate its extremities and connecting said bands, and an operating lever engaged with one of said bands, said evener extending longitudinally of the car, and having a vertical oscillation upon its fulcrum, substantially as described.

10. In a car brake, the combination of the band brakes D, D', an evener connecting said brakes extending longitudinally therewith, and an operating lever to apply the brakes, the friction of the front wheel upon the front brake serving to tighten the rear brake upon the rear wheel, substantially as set forth.

11. In a car brake, the combination with a front and a rear wheel, of a car truck, of an independent brake to engage each of said wheels connected the one with the other, and means to tighten the front brake upon the front wheel, the force of the front wheel upon the corresponding brake serving to tighten the rear brake upon the rear wheel, substantially as set forth.

12. In a car brake, the combination with a front and a rear wheel, of a car truck, of independent band brakes located over said wheels connected the one with the other, whereby as the rear end of the front brake is lifted, the front end of the rear brake is forced downward, and means to tighten the front brake upon the front wheel, the force of the front wheel upon the corresponding brake serving to tighten the rear brake upon the rear wheel, substantially as set forth.

In testimony whereof I sign this specification in the presence of two witnesses.

JOHN KERWIN.

Witnesses:
  N. S. WRIGHT,
  JOHN CAMPBELL.